Sept. 2, 1969    G. IRWIN    3,464,335
CAMERA WITH FLASHCUBE MECHANISM
Filed July 5, 1966    3 Sheets-Sheet 1
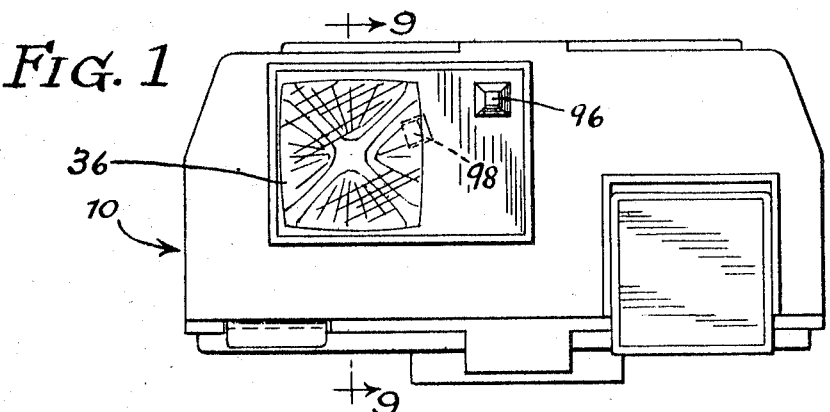
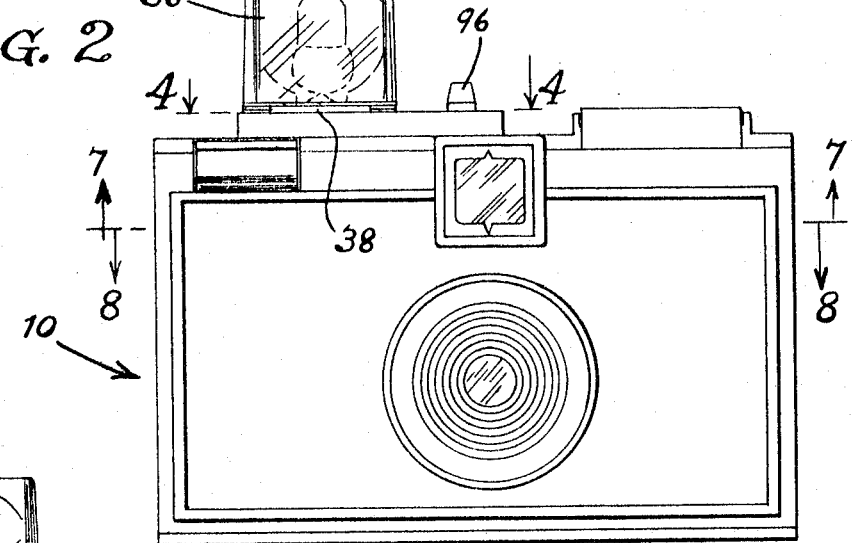
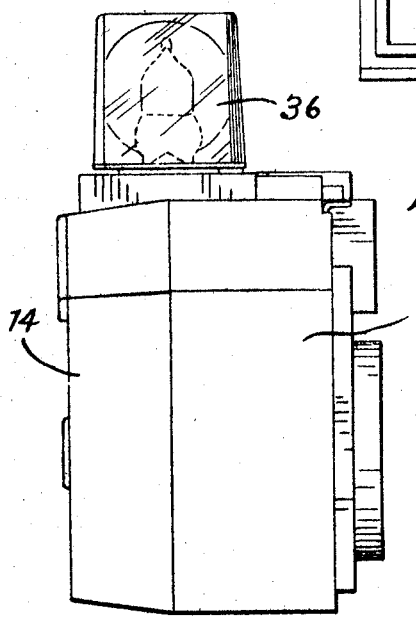
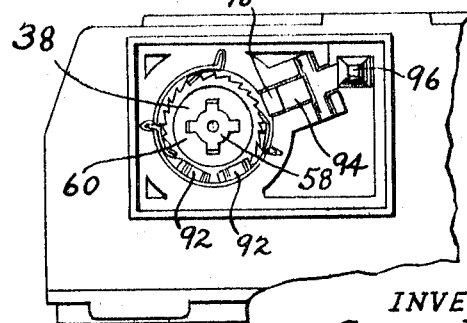
INVENTOR.
George Irwin
BY McDougall, Hersh
Scott and Ladd
Atty's

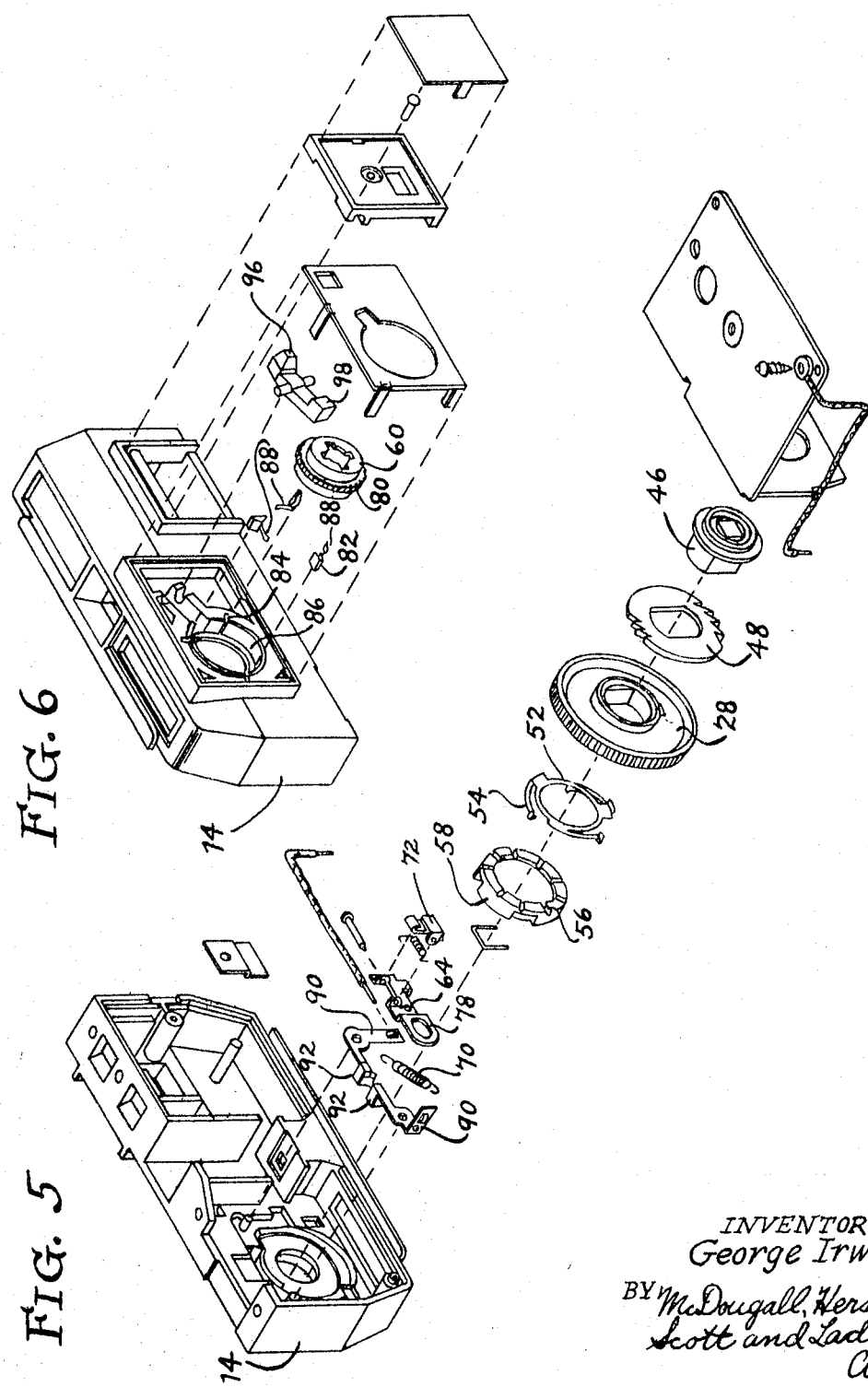

Sept. 2, 1969  G. IRWIN  3,464,335
CAMERA WITH FLASHCUBE MECHANISM
Filed July 5, 1966  3 Sheets-Sheet 3

INVENTOR.
George Irwin
BY McDougall, Hersh,
Scott and Ladd
Att'ys

United States Patent Office 3,464,335
Patented Sept. 2, 1969

3,464,335
CAMERA WITH FLASHCUBE MECHANISM
George Irwin, 1747 Elmwood Drive,
Highland Park, Ill. 60035
Filed July 5, 1966, Ser. No. 562,561
Int. Cl. G03b 19/00, 19/04
U.S. Cl. 95—11                                                   4 Claims

ABSTRACT OF THE DISCLOSURE

A camera construction consisting of a housing for holding a film cartridge and a flashlamp socket for holding a lamp of the type having a plurality of flashbulbs. A drive mechanism is provided for moving the lamp socket in conjunction with the film advancing device. A spring element forms a drive coupling between the lamp socket and the film advancing device, and a locking member is provided for engaging the socket when a bulb has been moved to the proper position. Continued movement of the film advancing device overcomes the spring action whereby the lamp socket will not be moved along in conjunction with the film advancing device. The locking member for the socket is automatically released when the camera shutter is actuated so that movement of the socket to the next bulb position can be accomplished.

---

This invention relates to a camera construction designed for use in combination with a flashcube. Flash structures of this type comprise a plurality of separate flashbulbs associated with a single mounting. The bulbs are adapted to be energized in sequence whereby the operator of a camera can take a plurality of pictures before changing the flash structure.

This invention will be described with reference to camera constructions adapted for use in combination with film magazines. Nerwin Patent No. 3,138,081, issued on June 23, 1964, illustrates a construction comprising a roll film magazine wherein a length of film is located within a magazine body. One end of the film is attached to a spool at one side of the magazine while a supply roll of film is located at the other side of the magazine. An opening is defined by the back of the magazine whereby movement of the film will provide for exposure through this opening. When the film is associated with a camera adapted to rotate the spool, the picture can be taken.

A camera adapted to be used in conjunction with the magazine is disclosed in Harvey Patent No. 3,138,084. This camera is provided with a sensing finger which is adapted to engage the surface of the film in the cartridge. Perforations are defined by the film, and these perforations are spaced at intervals which correspond to a frame of the film. The sensing finger is adapted to successively engage these perforations as the film is moved in the camera. Engagement of a perforation by the sensing means will impede further movement of the film whereby the user of the camera can automatically determine when the film is in a position for taking the next picture. In the Harvey construction, a separate button is provided on the camera for disengaging the sensing finger to permit further movement of the film.

Applicant's copending application Ser. No. 465,950, now Patent No. 3,406,621, describes a camera construction which is uniquely suitable for use in conjunction with such film magazines. This camera construction includes a sensing member adapted to engage perforations in roll film whereby the film can be accurately indexed and whereby other camera operations can be precisely controlled. The construction described specifically combines means for controlling indexing movement of the film in a camera while at the same time providing a latching arrangement for the camera shutter whereby the camera cannot be operated unless the film is in proper position.

The introduction of flashcube constructions provides added advantages for individuals taking pictures. In prior arrangements using flashbulbs, it was necessary to insert a separate bulb after each picture was taken. With such an arrangement, a relatively extendind time delay takes place between successive picture taking operations. The flashcube arrangement permits successive pictures by merely shifting the position of the cube after a picture is taken.

It is a general object of this invention to provide a camera construction which is uniquely suitable for operation with flash constructions of the flashcube type.

It is a more specific object of this invention to provide a camera of the type described which includes mechanisms permitting the use of film magazines and flashcube arrangements in combination whereby the camera can be operated with maximum convenience.

These and other objects of this invention will appear hereinafter and for purposes of illustration, but not of limitation, specific embodiments of this invention are shown in the accompanying drawings in which:

FIGURE 1 is a plan view of a camera construction characterized by the features of this invention;

FIGURE 2 is a front elevational view of the camera construction;

FIGURE 3 is a side elevational view of the camera construction;

FIGURE 4 is a detail illustration taken about the line 4—4 of FIGURE 2;

FIGURE 5 is an exploded view illustrating the drive components employed within the camera housing;

FIGURE 6 is an exploded view illustrating the flashcube mounting means and other components mounted on the exterior of the camera housing;

The camera construction of this invention generally comprises a housing for holding a length of film and means for advancing the film. A flash lamp holder is associated with the housing and the holder is designed for holding a lamp of the flashcube type wherein a plurality of flashbulbs are associated with a common mounting.

The improvement of this invention generally relates to means for moving the lamp whereby the flashbulbs can be successively moved into position for picture taking. A drive element is employed for moving the lamp, and this element is operatively connected to the film advancing means. A drive coupling is interposed between this drive element and the lamp holder whereby the holder will rotate in response to the action of the drive element when the drive coupling is engaged. A critical aspect of the instant invention involves means for disengaging the drive coupling from driving engagement with the lamp holder. With this arrangement, the film advancing means is adapted to continue advancing movement after the lamp has been properly positioned.

The structure of this invention is particularly adaptable for use in combination with film magazines of the type referred to. As will be explained in detail, the driving action is adapted to be coordinated with the film magazine whereby engagement and disengagement of the drive coupling can be accurately controlled. It will be understood, however, that the basic concepts of the instant invention are applicable to cameras other than those employing films of the type specifically referred to herein.

The accompanying drawings illustrate a camera construction 10 which embodies the subject matter of this invention. The construction comprises a casing 12 having a removable back 14. A film cartridge of the type described in the aforementioned patents is adapted to be inserted into the camera after which the removable back 14 is locked into place whereby pictures can be taken.

Figure 7:
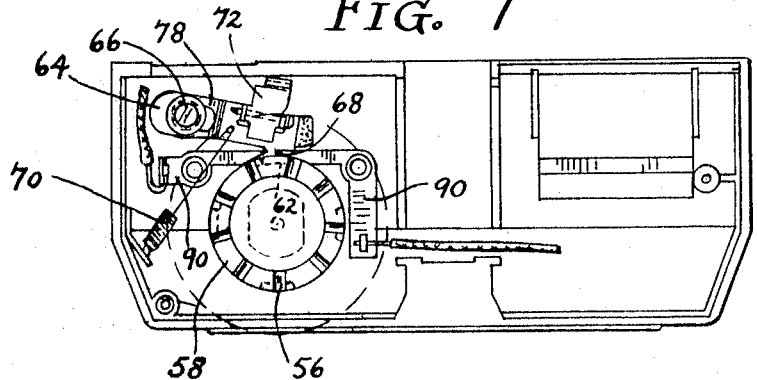
FIGURE 7 is a horizontal cross-sectional view taken about the line 7—7 of FIGURE 2.
Figure 8:
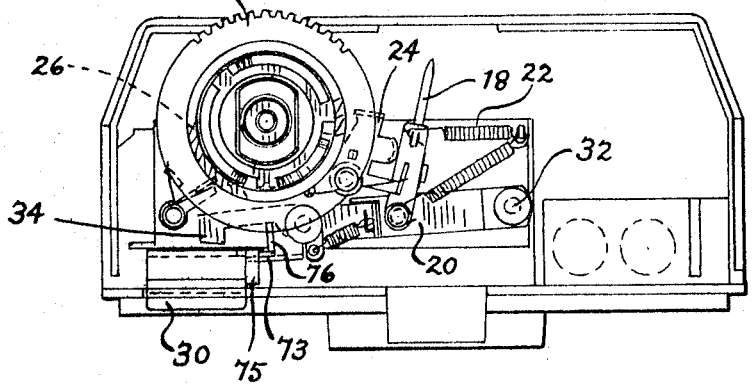
FIGURE 8 is a horizontal cross-sectional view taken about the line 8—8 of FIGURE 2.
Figure 9:
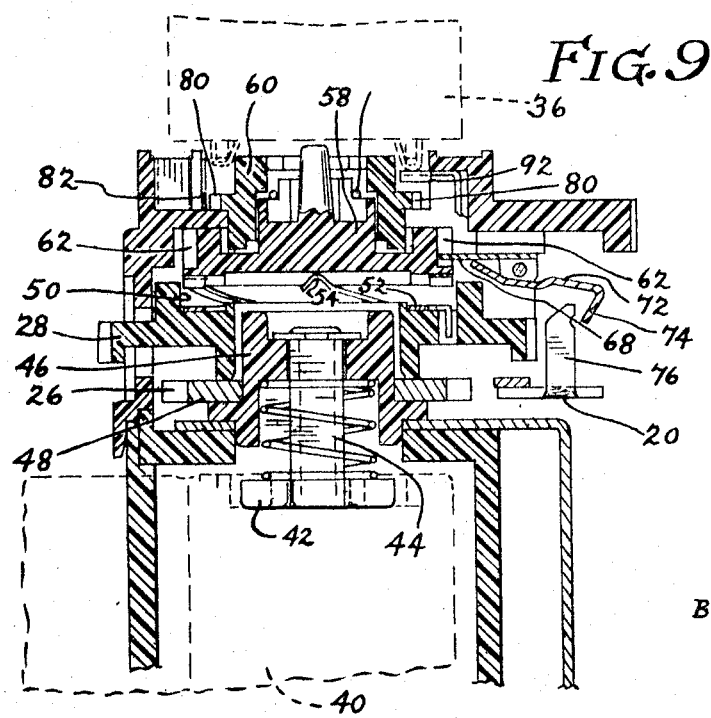
FIGURE 9 is an enlarged fragmentary cross-sectional view taken about the line 9—9 of FIGURE 1.

The particular camera construction shown embodies mechanical elements of the type illustrated in applicant's aforementioned copending application. As noted in said application, a slot is defined by the film cartridge. This slot exposes perforations defined by the film carried in the cartridge, and a sensing finger 18 (see FIGURE 8) is adapted to be received in these perforations as the film advances. The combination of the perforations and the sensing finger serves to align the frame of the film in a proper position for taking each picture. Operation of the camera shutter mechanism releases the sensing finger from the perforations whereby the film can be advanced to the next frame at which time the next perforation operates in combination with the sensing finger to lock the film for purposes of taking the next picture.

A portion of the structure described in applicant's aforementioned copending application is disclosed herein since the novel features of this invention are adapted to be employed in combination with this prior structure. As described in this copending application, the finger 18 is adapted to be received in a perforation at which time the finger pivots about its mounting on the arm 20. The spring 22 normally urges the finger in opposition to this pivoting movement. When the finger 18 is moved in a counterclockwise direction by a film perforation, the pawl 24 is brought into engagement with ratchet teeth 26. This prevents further movement of the film advancing knob 28.

This mechanism described in the aforementioned application also provides for locking of the shutter actuating member 30 during film advancing. Thus, the finger 18 rides against the back of the film during film advance, and in this condition, the arm 20 is pivoted in a counterclockwise direction about pivot point 32. This brings the extension 34 formed at the end of the arm 20 into an opening defined by the shutter actuating member 30. Accordingly, the member 30 cannot be pushed downwardly until the finger 18 is received in the next film perforation at which time the film frame will be in the desired position.

The instant invention specifically contemplates a means for automatically positioning the flashcube 36 (FIGURES 1 through 3) during film advance. This is accomplished by mounting the flashcube in a socket 38 which is coupled to the film advance knob 28.

As best shown in FIGURES 5 through 9, a film cartridge 40 is inserted within the camera, and a drive sprocket element 42 is adapted to fit into the film cartridge. The shaft 44 of the sprocket member 42 is secured to a sleeve element 46, and ratchet wheel 48 carrying ratchet teeth 26 is attached to the sleeve. The film advance knob 28 is also tied to these members whereby the sprocket 42 will move in direct response to rotation of the film advance knob 28.

The top side of the knob 28 defines a recess 50 and a drive coupling element 52 is received in this recess. The coupling element 52 carries fingers 54 which are adapted to interfit with grooves 56 defined by the bottom side of the element 58. The element 58 combines with the element 60 to form the socket 38.

The element 58 defines recesses 62 around its periphery. In accordance with the embodiment illustrated, four such recesses are provided, each offset 90° with respect to adjacent recesses. This corresponds with the arrangement of the bulbs in the flashcube construction. As will be apparent when considering the following description of the operation of the disclosed structure, the number and position of recesses 62 will vary depending upon the bulb positions employed in the flashcube.

A stop member 64 is pivotally attached to the camera housing by means of the pin 66. The stop member includes a projection 68 which is adapted to be received by the recesses 62. A spring 70 has one end attached to the stop member 64 while the other end is attached to the camera housing. With this arrangement, the projection 68 normally presses against the side wall of the member 58.

The stop member 64 includes an element 72 located on its underside. A return portion 74 of the element 72 is adapted to be engaged by projection 76 formed on the arm 20. When the shutter actuating element 30 is moved downwardly, an extension 73 is engaged by a cam member 75 associated with the element 30. This pulls the arm 20 forwardly whereby the projection 76 will pull the projection 68 out of a recess 62.

It will be noted that a slot 78 is defined in the end of the stop member 64. When the projection 68 is pulled out of a recess 62, the stop member 64 shifts whereby the projections 68 will bear on the side wall of the member 58.

It will be noted that the element 60 of the socket 38 defines ratchet teeth 80. A plurality of pawl members 82 are inserted in slots 84 which are defined by the wall 86. As shown in FIGURE 6, this wall defines the opening within which the element 60 is inserted. The pawls 82 include spring projections 88 which engage the ratchet teeth 80. The pawl members prevent the element 60 from shifting in reverse after the flashcube has been rotated to a desired position. They thus serve as stops which prevent reverse shifting movement which might occur as a result of the spring actions which characterize the disclosed structure.

In order to provide the necessary electrical characteristics, contact strips 90 are positioned in association with the socket 38. The contact strips include end portions 92 which are adapted to be bent-over in the manner shown in FIGURE 4 whereby contact elements defined by the flashcube 36 can engage the portions 92.

The construction also includes a flashcube ejection element 94. This element comprises a pivotal member having an actuation button 96 at one end and an ejection element 98 at the opposite end. This arrangement can be readily mounted adjacent the flashcube socket in the manner shown in FIGURE 4. A flashcube in the socket will be lifted up when the button 96 is pressed down. The insertion of a new flashcube will reset the ejection mechanism.

In the operation of the illustrated construction, a film cartridge is inserted, and the knob 28 is then rotated until the finger 18 senses the first perforation in the film. The finger 18 drops into the perforation, and slight continued advancement of the film causes the pawl 24 to engage a tooth 26 whereby the advancing knob 28 will be locked. A flashcube can be inserted in the proper position, and since the extension 34 is held out of engagement with the member 30, a picture can be taken.

When the shutter actuating member is moved downwardly, the cam element 75 will force the arm 20 forwardly whereby the projection 76 will cause the projection 68 to be pulled out of a recess 62 in the socket element 58. When this occurs, the interaction of the spring 70 and slot 78 will cause the stop arm 64 to shift whereby the extension 68 will not fall back into a recess 62 when the shutter actuating member 30 is released.

To prepare for taking the next picture, the knob 28 is rotated. The drive coupling 52 causes the flashcube socket and the flashcube to rotate with the knob 28. After rotation of the socket through 90°, the projection 68 will fall into the next recess 62. Slight additional advancement will cause the stop arm 64 to move to the cocked position in opposition to the spring 70. At this time, the socket and flashcube will remain stationary even when advancement of the knob 28 is continued. The pawl members 88 will prevent any backward shifting of the socket and flashcube.

Advancement of the knob 28 can be continued since the drive coupling 52 incorporates a slip clutch action. Thus the fingers 54 comprise spring members whereby the coupling element 52 can continue to rotate with the knob 28 while the socket element is held stationary.

Advancement of the knob 28 continues until the finger 18 is received in the next perforation in the film. At this point, the above described sequence of operations is repeated.

It will be noted that the construction of the instant invention provides for positioning of the flashcube irrespective of the amount of rotation necessary to provide for advancement of the film from one frame to the next. Thus, a flashcube with four positions requires a rotation of the advancing knob through 90°. Additional advancement of the knob is necessary in order to provide the necessary film advancement and, accordingly, direct coupling of the flashcube socket with the film advancing knob would not be feasible. The construction of the instant investment provides an ideal coupling arrangement in that the flashcube can be accurately positioned without the necessity for a separate operation. Different types of film cartridges could be employed since proper operation of the flashcube positioning means does not depend on the degree of rotation necessary for film advancement. Finally, the disclosed construction provides for simultaneous release of the flashcube advancing and film advancing mechanisms upon actuation of the shutter. It will be noted that the instant invention provides extreme advantages from an efficiency standpoint in that applicant's prior film advancing mechanism need only be modified to a slight degree in order to incorporate the flashcube positioning mechanism.

It will be understood that various changes and modifications can be made in the above described construction which provide the characteristics of this invention without departing from the spirit thereof particularly as defined in the following claims.

I claim:

1. In a camera construction including a housing for holding a length of film, said film being of the type included within a cartridge, said film defining spaced-apart perforations for locating the successive frames in the film, the camera also including sensing means adapted to detect said perforations, means for advancing said film, means for actuating the shutter mechanism of the camera, and a flashlamp socket associated with said housing, said socket being designed for holding a lamp of the type comprising a plurality of flashbulbs, said bulbs being adapted to be successively energized when moved to picture taking position, the improvement comprising means for moving said lamp including a drive element, means operatively connecting said drive element to said film advancing means, means interconnecting said drive element and said sensing means whereby said drive element is locked against continued advancement when the successive film frames are moved to picture taking position, a drive coupling between said drive element and said socket adapted to rotate said socket in response to the action of said drive element, said drive coupling including spring means normally engaging said socket, separate locking means adapted to engage said socket at an intermediate point in the advancement of said drive element, said spring means being adapted to move relative to said socket after said separate locking means engage said socket whereby said drive element is adapted to continue advancing movement after a lamp has been properly positioned, and wherein the means for actuating the shutter mechanism of said camera operates to simultaneously release said sensing means for engagement with said film and to release said separate locking means from engagement with said socket.

2. A construction in accordance with claim 1 wherein said spring means include a plurality of fingers engaging the underside of said socket.

3. A construction in accordance with claim 1 wherein said socket defines a plurality of recesses, said recesses corresponding in number to the number of bulbs in said lamp, the locking means for said socket comprising means adapted to extend into said recesses for retaining the socket against continued rotation, and including means interconnected with said shutter mechanism for moving said extending means out of said recesses.

4. A construction in accordance with claim 3 wherein said extending means are mounted on a slideable arm, and including means for shifting the position of said arm after said extending means moves out of a recess whereby said extending means will not return to a recess when said shutter actuating mechanism is released.

References Cited

UNITED STATES PATENTS

| | | | |
|---|---|---|---|
| 3,138,081 | 6/1964 | Nerwin | 95—31 |
| 3,148,605 | 9/1964 | Peterson et al. | 95—31 |
| 3,232,196 | 2/1966 | Sapp et al. | 95—31 |
| 3,335,651 | 8/1967 | Williams et al. | 95—11 |
| 3,353,466 | 11/1967 | Charney | 95—11.5 |
| 3,369,468 | 2/1968 | Sapp et al. | 95—11.5 |

NORTON ANSHER, Primary Examiner

F. L. BRAUN, Assistant Examiner

U.S. Cl. X.R.

95—31